March 16, 1971    J. E. DRAPER ETAL    3,570,050
PROCESS FOR REMOVING MEAT FROM BONES
Filed March 26, 1968    3 Sheets-Sheet 1

```
REMOVE WINGS AND LEGS FROM BIRD
              |
CUT THORAX AXIALLY ON EACH SIDE
        WITH WATER JET
              |
DIRECT WATER JETS IN PLANE INTER-
  SECTING KEEL AT SMALL ANGLE TO
      REMOVE BREAST FILLETS
              |
TUMBLE CARCASS UNDER MULTIPLE JETS
  TO REMOVE REMAINING MEAT PIECES
              |
REMOVE DRUM STICK FROM THIGH AND
EXPOSE THIGH TO JETS POSITIONED
TO SEPARATE THE MEAT PIECES FROM
            THE BONE
```

FIG 1

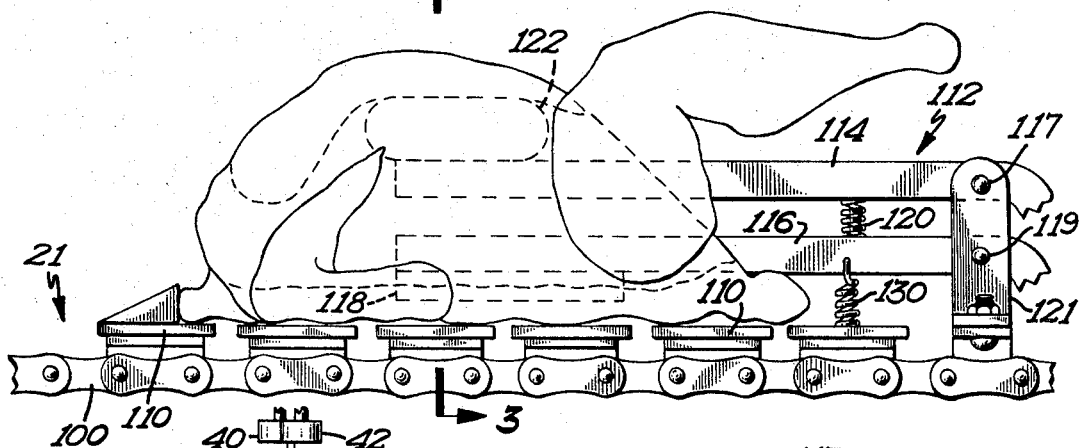

FIG 2

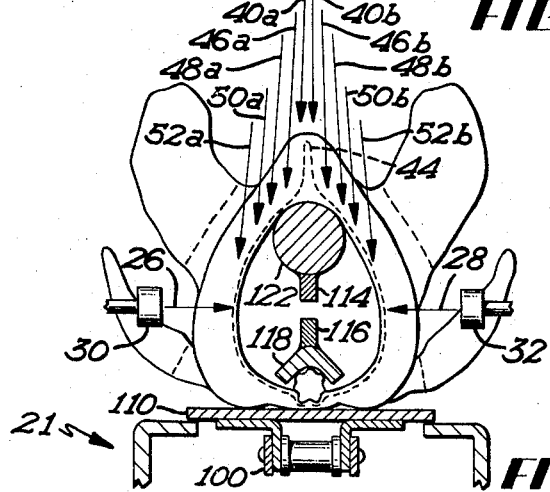

FIG 3

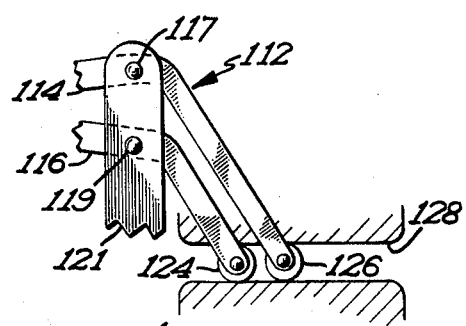

FIG 4

INVENTOR.
JACK J. REJSA
BY   JAMES E. DRAPER

ATTORNEY

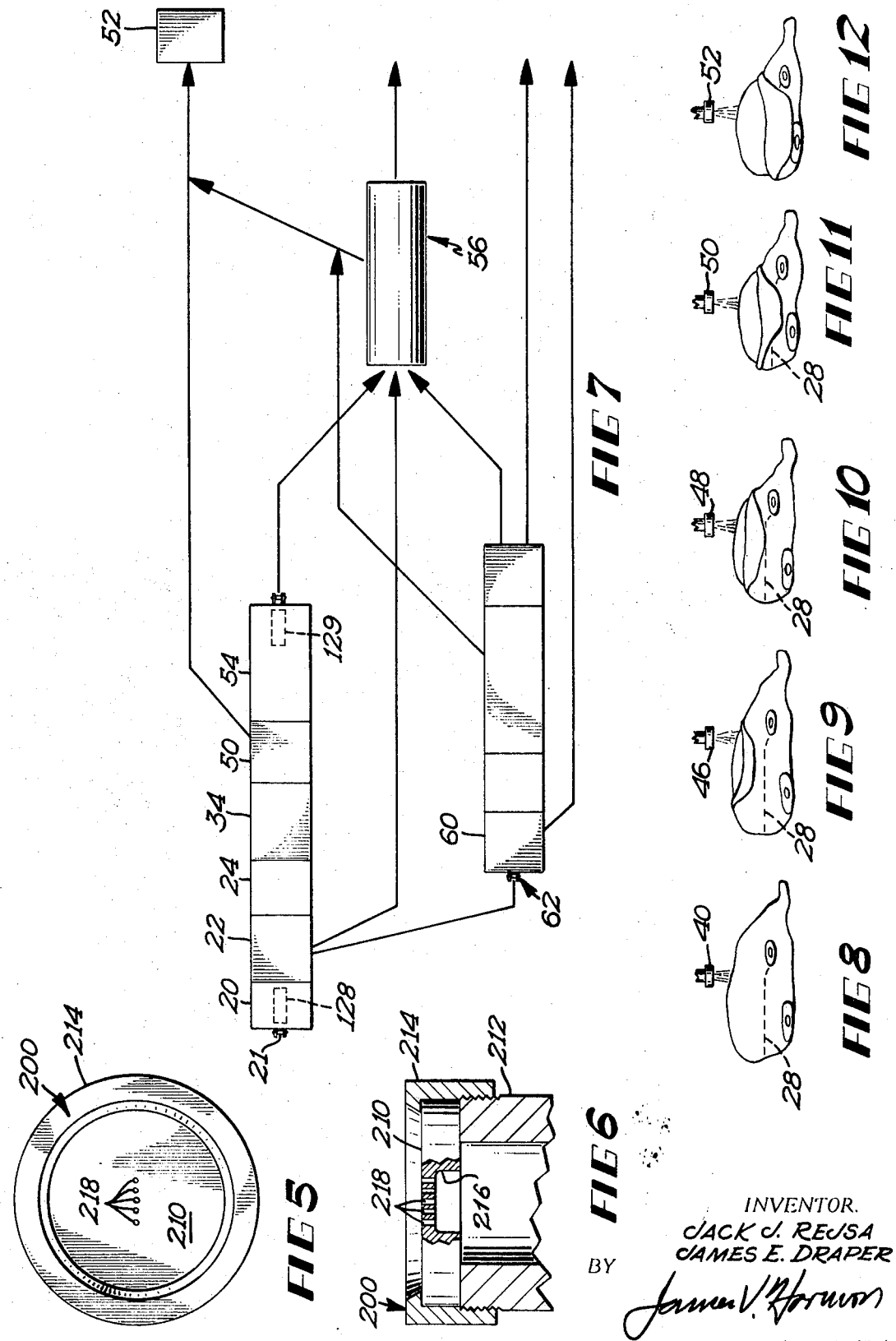

United States Patent Office 3,570,050
Patented Mar. 16, 1971

3,570,050
PROCESS FOR REMOVING MEAT FROM BONES
James E. Draper and Jack J. Rejsa, Minneapolis, Minn., assignors to The Pillsbury Company, Minnneapolis, Minn.
Filed Mar. 26, 1968, Ser. No. 716,138
Int. Cl. A22c 17/04
U.S. Cl. 17—46                                13 Claims

ABSTRACT OF THE DISCLOSURE

A process for removing meat from bones of animals, e.g. chickens, in which a nozzle is used to form a jet of a liquid (water or other liquid) having the form of a relatively thin sheet composed of several aligned parallel streams. The jet is directed at the animal preferably at a relatively small angle of incidence to the surface of the bone. The animal is placed upon a conveyor and advanced relative to the jet to form an elongated knife-like cut through the meat. In a typical application breast fillets are removed from the sternum (keel) and rib cage.

---

The present invention relates to the preparation of food products and more particularly to a process for cutting and removing meat from bones with at least a portion of the meat being in the form of relatively large chunks or whole pieces. While the invention is useful in connection with a variety of animals including shellfish it is particularly suited for vertebrates. The invention will be described herein in connection with poultry.

Of the many systems previously proposed for removing flesh from bones, none have been entirely satisfactory for removing the flesh before it is cooked. The resulting products are thus unsuited for many purposes.

Other processes for removing the meat from bones have only been suitable for certain parts of the animal such as the necks because of the relatively poor directive accuracy of the liquid jets employed. For these and other reasons, a liquid jet has not been successfully employed for removing relatively large chunks such as fillet-size pieces.

It is, of course, well known to remove meat from the bones by converting the meat to a paste or to pieces about ⅛ inch in diameter. While material of this kind can be readily employed in spreads, wieners and sausages, the product sells at a relatively low price and is wholly unacceptable for use as a convenience food to be served as roast or fried chicken or in a main dish.

In view of the deficiencies of the prior art, the present invention has among its objects the following characteristics and advantages: (a) the ability to effectively produce elongated uninterrupted knife-like cuts with a liquid jet and thereby remove relatively large fillet-size pieces of meat from the bone of uncooked vertebrates; (b) the ability to remove the meat from the bone with little of the meat remaining on the bone; (c) the provision of an effective hydraulic knife for removing meat from bone with a minimum amount of liquid; (d) a provision for conducting a series of prescribed steps for removing meat from bone that will result in the maximum production of relatively large fillet-size pieces suitable for use in a main dish and a minimum of small fragments; (e) an effective provision for positioning the birds relative to the hydraulic knives so that the knife cuts will be properly located on the animal being processed and (f) a provision for effectively removing scraps of meat that remains on the carcass.

These and other more detailed and specific objects will be apparent in view of the following specification and accompanying drawings wherein:

FIG. 1 is a chart illustrating the steps performed in accordance with one form of the invention.

FIG. 2 is a side elevational view of a bird placed in position on a conveyor employed for conducting the birds past the hydraulic cutting knives.

FIG. 3 is a cross sectional view on line 3—3 of FIG. 2.

FIG. 4 is a partial side elevational view showing the apparatus employed for supporting the bird as it travels through the loading station.

FIG. 5 is a plan view of a nozzle employed in accordance with the invention.

FIG. 6 is a vertical sectional view of a nozzle in accordance with the invention.

FIG. 7 is a diagram illustrating the flow of material from one operating station to the next.

FIGS. 8–12 are successive semi-diagrammatic side elevational views of birds as they travel from left to right past the hydraulic knives used for removing the breast fillets.

Figure 13:
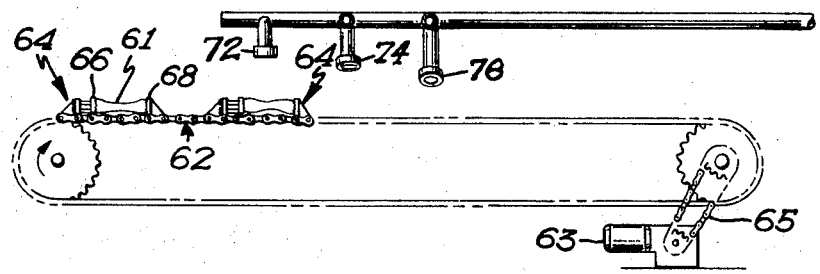
FIG. 13 is a semi-diagrammatic side elevational view of the apparatus employed for removing meat from the thigh bones.

In the experimental work that was conducted during the development of the present invention, it was found that a single cylindrical stream of water is ineffective for producing an elongated continuous knife-like cut in uncooked meat primarily because the jet tended to pierce the meat at spaced intervals so as to produce a series of aligned openings rather than a continuous cut. While a short cut could be produced at times, pieces of skin between the adjacent sections of the cut would remain intact.

In an attempt to alleviate this problem, nozzles having narrow slit-like openings were tested. It was found, however, that the jet spread apart excessively and did not cut effectively beyond a short distance from the nozzle opening. A multiple orifice nozzle design which will be described below was then evolved. This nozzle is capable of making elongated continuous cuts with no tendency to spread excessively. It was found that a plurality of water jet knives of this type when employed in succession were effective for cleanly removing relatively large fillet-size pieces of uncooked meat.

A further aspect of the invention is a novel selection and arrangement of process steps which maximize the production of large fillet-size pieces, minimize the quantity of meat clinging to the bones and produce a meat product which is accepted by the consumer and is easily sold.

To the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Refer now particularly to FIGS. 1 and 7 concerning the process employed for removing the meat in accordance with the present invention.

To begin the operation, a vertebrate that is to be processed, e.g. an uncooked broiler chicken that has been previously cleaned and eviscerated is loaded at station 20 on a supporting fixture and is advanced by an endless conveyor 21 at a predetermined uniform speed past a first operator station 22 where the wings and legs are removed. This operation is preferably performed manually using ordinary knives.

At station 24 as seen in FIG. 7 the thorax is cut axially along horizontal lines 26 and 28 of FIG. 3 by means of a liquid (typically water) expelled through nozzles 30 and 32 respectively to be described fully below. The cuts should extend entirely through the meat on the thorax to the ribs.

At station 34 of FIG. 7, the breast fillets are removed by liquid jets as shown in successive stages in FIGS. 8–12 by passing the birds first beneath almost vertically disposed pair of laterally aligned nozzles 40 and 42 positioned to direct streams 40a and 40b substantially in the plane of each side surface of the ventral process of the sternum 44. As the bird moves beneath the stationary nozzles 40 and 42, axially extending cuts will be made in the breast between the sternum 44 and the breast fillets thereby separating the ventral fillets from the ventral edge of the sternum. Where separation of meat from bone is to be accomplished, the angle of incidence of the jet relative to the surface of the bone should be less than 45° but preferably less than 30°. In practice, angles of less than 10° are often used.

If desired, a metal knife can be used in place of nozzles 40 and 42 for cutting the skin. As seen in FIGS. 3 and 9, the birds then travel beneath a second pair of laterally aligned nozzles, only one of which is shown at 46 to produce streams 46a and 46b that are directed at points on the sternum spaced slightly from the ventral process of the sternum. The birds thus travel in turn through successive laterally aligned pairs of nozzles 48, 50 and 52, each positioned at a slightly lower elevation and each directed to produce jets 48a, 50a and 52a. As each successive jet is encountered, successive portions of the fillet adjacent the sternum are separated from the sternum until the axially extending thoracic cuts 26 and 28 are met at which point the fillets can be removed. The jets on the left as seen in FIG. 3 are designated 40a, 46a, 48a, 50a and 52a and those on the right are designated 40b, 46b, 48b, 50b and 52b.

The jet of water escaping from nozzles 30, 32, 40 and 42 forms a thin sheet composed of parallel streams and the sheet in each case is maintained parallel to the path of movement of the bird. Jets 46, 48, 50 and 52 may be either single or parallel stream jets. At station 50 (FIG. 7) the fillets are moved to a packing station 52. At station 54, the bird supporting fixture is released and what remains of the skeleton is placed in the deboning drum 56 which will be described hereinbelow. The wings which were removed at station 22 are also placed in the drum 56.

The drumsticks are preferably separated conventionally with an ordinary knife from the thighs and marketed without further treatment. The thighs 61 are transferred to a station 60 where they are placed on an endless chain conveyor 62 (FIG. 13) including a plurality of longitudinally spaced brackets 64 having jaws 66 and 68 which carry the thighs past a first nozzle 72, next past a pair of laterally aligned nozzles 74 and 76 and finally past a pair of laterally aligned nozzles 78 and 80 to which water is supplied under pressure through line 82. The conveyor 62 is driven by a motor 63 which is coupled to the conveyor 62 by a chain 65. The jets from nozzles 72–80 have the shape of either a single circular stream or a thin sheet composed of parallel streams in a plane parallel with the path of the chain conveyor and the piece that is being processed.

Figure 15:
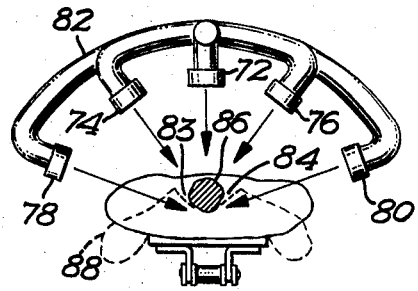
FIG. 15 is a vertical sectional view taken on lines 15—15 of FIG. 14.

As each thigh is subjected to the action of jets from nozzles 72, 74, 76, 78 and 80, the separations designated 83 and 84 between the bone 86 will become wider and deeper until the meat assumes the position 88 as seen in the FIG. 15. The meat can then be easily separated from the bone.

An important advantage of the present invention is the surprisingly small amount of material that remains clinging to the bones when the jet is properly positioned relative to the bone. It was discovered that by providing a jet having the overall form of a relatively thin sheet composed of a plurality of aligned parallel streams with the sheet positioned at a small angle, preferably less than 30° relative to the surface of the bone, the meat can easily be removed in large pieces, e.g. entire fillets with a clean separation between the meat and the bone even though the meat has not been cooked. While the exact reason for the effectiveness of the separation is not known with certainty, it is believed that the small angle of incidence between the jet and the surface of the bone causes the bone to act as a baffle so that the stream of liquid deflected from the bone progressively peels away the attached muscle and connective tissue.

The conveyor 21 employed for conveying or transporting the fowl from stations 20–54 will now be described with particular reference to FIGS. 2, 3 and 4. An endless chain 100 is entrained over longitudinally spaced vertically disposed and aligned sprockets (not shown) suitably driven to move the upper reach of the chain 100 slowly from left to right as seen in FIGS. 2 and 7 past the hydraulic jets. Secured to the chain are longitudinally spaced supporting plates 110 upon which the birds rest. Each bird is securely held in a precisely predetermined position by means of a supporting fixture 112 composed of parallel longitudinally extending vertically spaced clamp arms 114 and 116 pivotally mounted at 117 and 119 respectively upon a vertically disposed post 121 which is itself secured to the chain 10. The arm 114 is provided with a cylindrical jaw 122 adapted to engage the ventral surface of the thoracic cavity. The arm 116 is provided with a jaw member 118 adapted to engage the inner aspect of the vertebrae. A spring or other suitable resilient means 120 is mounted between the arms to force the jaws apart to thereby securely engage and center the bird. The ends of the arms opposite the jaws are provided with cam followers 124 and 126 positioned to enter camming slots 128 and 129 at loading and unloading stations respectively for the purpose of forcing the arm 114 downwardly and the arm 116 upwardly against the forces exerted by springs 130 and 120 (FIG. 2). In this manner, the jaws are forced toward one another allowing the birds to be placed on the fixtures when the followers 124 and 126 engage the camming slot. When the followers engage the unloading slot 129 (FIG. 7), the birds can be unloaded.

Figure 16:
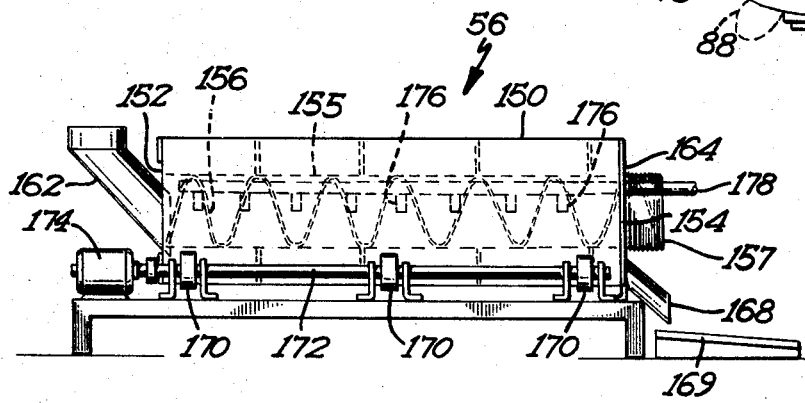
FIG. 16 is a side elevational view of an apparatus employed for removing meat scraps that remain on the bones.

Refer now to FIG. 16 with reference to the deboning apparatus 56. A hollow metal cylinder 150 is provided with an inlet opening 152 at one end and an outlet at the opposite end 154. Concentrically mounted therein is a screen 155 preferably formed from circumferentially extending triangular bars having one flat surface in the plane of the inside surface of the screen. The space between the bars can be about .030 inch. A helically disposed auger flight 156 is welded to the inside surface of the screen 155. Adjacent the inlet end 152 of the cylinder 150 is a feed chute 162. Adjacent the outlet end 154 is a closure plate 164 containing an outlet duct 168 for the removal of meat and water. Bone is removed from the open end 157 of screen 155. From duct 168 the meat falls onto a screen 169 composed of parallel triangular bars spaced .010 inch apart.

The cylinder 150 is supported upon two identical sets of laterally spaced rollers each consisting of three longitudinally aligned rollers 170, only those on one side in FIG. 16 being shown. The rollers 170 are mounted on a shaft 172 driven by a motor 174 so as to impart rotation to the drum 150 at a speed of about 15 r.p.m. will be suitable for most purposes. During operation, the chicken bones with the pieces of meat clinging to them are introduced through the chute 162 and tumble randomly as they are conveyed from left to right as seen in FIG. 16 by the auger flights 156. As the pieces move through the cylinder 150, water expelled under high pressure through nozzles 176 removes the remaining pieces or meat fragments from the bones. The water preferably is supplied through line 179 at a pressure of at least about 4000 p.s.i.

The nozzles 176 can be of any conventional known construction. Nozzles having a single cylindrical bored opening of .020 inch in diameter will be suitable.

The nozzles shown in FIGS. 3, 5 and 6 will now be described with particular reference to FIGS. 5 and 6. The nozzles 200 consist of a circular disk 210 that is held in position on the end of a duct 212 by a threaded cap 214. The disc 210 is provided with a central recess 216 which in practice has a diameter on the order of about ⅛ inch. Communicating through the disk at the end of the recess 216 are a plurality of cylindrical aligned parallel bored openings 218. In a typical application, five of the openings 218 are provided.

The openings, it was discovered, will cause excessive dispersion or disruption of the water jets passing therethrough if smaller in diameter than about .002 inch and the resulting jets have insufficient energy to cut the tissue effectively. On the other hand, if the openings are much larger than about .020 inch excessive amounts of water will be required. Openings on the order of about .004 to about .008 are preferred. While the nozzle can be formed from a variety of materials, stainless steel of a type designated 440C hardened to $R_C$ 60 minimum is suitable. The openings 218 can be formed, for example, with an electric discharge boring machine.

The spacing between the nozzle openings is preferably relatively small, typically the same distance as the diameter of the openings themselves. Good results have been obtained with the spacing between each of the openings being identical to the diameter of each opening. If the openings are placed much closer together than this, it was found that the thinness of the walls produces a structural weakness in the nozzle itself which results in the formation of cracks and occasionally the removal of a portion of the wall material between the openings. The presence of this discontinuity causes misdirected streams to be formed and tends to atomize the entire stream. Moreover, as the aligned openings approach more closely the configuration of a single slot, the hydraulic effects characterizing the efflux of an elongated opening, viz the formation of inversions (unusual cross sectional shapes) are formed.

Additionally, the closer the streams are to one another the greater will be the tendency for atomization taking place in one stream to disrupt the flow of an adjacent stream and accordingly the streams will tend to atomize closer to the nozzle outlet.

In the experimental work leading to the development of the invention, the spacing between openings was varied with distances between openings being set at 1, 3 and 5 times the diameter of each of the openings. The openings in each case were .006 inch. The effect of greater spacing was to reduce the effectiveness of the nozzle for cutting skin. This adverse effect was more noticeable when the spacing between the openings was 5 times the opening diameter than when 3 times the opening. With a spacing of 3 times the opening diameter, the cutting operation was possible although it proceeded at a slower rate. From this work it was concluded that the spacing between openings when the nozzle is used for cutting loose skin or connective tissue should be from about .5 times the opening diameter to about 3 times the opening diameter with about 1–2 times the opening diameter being preferred.

The distance of the work from the nozzle opening will, of course, depend upon the hydraulic pressure, the diameter of the opening and the shape of the jet. It is, of course, obvious that the maximum distance is determined by the point at which the streams become atomized. With nozzles of the size described above cutting can generally be accomplished at distances of from about 2–12 inches from the nozzle opening.

With regard to the number of openings provided in the nozzle, it was found that while one opening will enable some cutting to be performed, the problem of making a continuous cut through skin is difficult as outlined above. Greatly improved results can be obtained by using two openings. It was found, however, that even with 3 openings some difficulty would be encountered in efficiently forming a continuous cut through skin with complete satisfaction. For this reason it is preferred that at least 3 and preferably 5 openings be provided.

The pressure of the water employed for cutting should be at least 500 and preferably at least 750 p.s.i. It is found that if the pressure is much less than 500 p.s.i. little, if any, cutting can be accomplished. Satisfactory results can be obtained with 750 p.s.i. but a range of from about 1000 to 5000 p.s.i. has been found most suitable for a nozzle of the size employed if the speed of the conveyor is about 20 feet per minute.

In the drum 56, backs are run at about 750 p.s.i. to 1500 p.s.i. to minimize bone breakage while wings, necks and thigh bones are run at a jet inlet pressure of about 3000 p.s.i. to 4000 p.s.i.

It was found that the breast fillets and other relatively large pieces could be removed from uncooked fowl using the present invention and that the process was surprisingly economical with regard to the amount of water required. It was found, for example, that in a typical operation as little as one quart of water is required to remove both breast fillets and that one nozzle could operate satisfactorily with water being supplied at the rate of about 14 gallons per hour. It should be noted that the jaws 122 and 118 serve to securely support the fowl, orient its axis parallel to the axis of motion of the conveyor and determine its lateral position precisely. In this way the cuts made by the nozzles are accurately positioned on the bird.

The effectiveness of the invention for removing relatively large fillet-size pieces of meat from fowl can be seen in the following chart in which the theoretical quantity of meat that can be removed by careful hand trimming as a percentage of the total weight of the bird is set forth in the University of Minnesota Station Bulletin No. 476 (December 1964) entitled "Factors Affecting Poultry Meat Yields" has been labeled "Average for Theoretically Perfect Deboning" and the percentage of material removed in accordance with the invention has been labeled "Invention."

PERCENTAGE OF MEAT AND BONE IN BROILER CHICKENS

|  | Invention, percent | Average for theoretically perfect deboning, percent |
|---|---|---|
| Drumsticks | 17.1 | |
| Breast fillets | 14.2 | |
| Thigh fillets | 12.7 | 64.8 / 69 |
| Meat chunk and skin | 20.8 | |
| Material in water and other loss | 16.9 | 35.2 / 31 |
| Bones | 18.3 | |

The invention will be better understood by reference to the following examples.

EXAMPLE I

Figure 14:
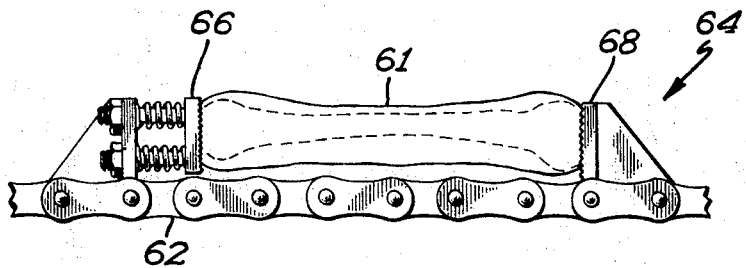
FIG. 14 is a partial side elevational view on a greatly enlarged scale relative to FIG. 13 showing one of the supporting brackets.

Broiler chickens having an average weight of about 2½ lbs. are picked and eviscerated. The jets 26 and 28 are formed by nozzles with 5 openings, each opening having a diameter of about .006 inch with a spacing of .006 inch between each opening. Water is expelled through the nozzle openings at a pressure of about 4000 p.s.i. The broiler chickens are advanced past the jets at a speed of about 20 feet per minute. The nozzles 40–42 are identical to those described above and the same water is used. The nozzles 46–52 are nozzles having a single opening with a diameter of .020 inch to which water is supplied at a pressure of about 3000 p.s.i. The thighs are processed as shown in FIGS. 13, 14 and 15 with the side to which skin remains attached facing downwardly. The nozzles employed for removing meat from the thigh bones each have a single opening of .020 inch. Water is supplied to these nozzles at a pressure of 3000 p.s.i. The carcasses from which the breast fillets have been removed are processed as described in connection with FIG. 16. A total of 75 nozzles are employed in the drum 56, each with a diameter of .020 inch, the water being supplied to the nozzles at a pressure of about 1250 p.s.i. when whole carcasses are being processed. When wings, necks and thigh bones are being processed the water pressure is increased to 3000 p.s.i.

EXAMPLE II

Chickens are processed the same as in Example I except that nozzles 40 and 42 are replaced with resiliently mounted metal knives for cutting through the skin.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A process for removing meat from the bone of an animal comprising:
    taking an animal having bone and meat naturally intact about the bone;
    subjecting the animal to a jet comprising a relatively thin sheet of liquid for cutting meat from the bone of the animal; and
    providing relative movement between the animal and the jet of liquid to effect a continuous, elongated knife-like cut successively through the meat and between the meat and bone by the liquid jet for separating the meat from the bone of the animal.

2. The process according to claim 1 wherein the fragments of meat remaining on the animal are removed by tumbling the animal randomly under streams of a liquid.

3. The process according to claim 1 wherein the animal comprises a fowl, the thighs of which are removed and exposed to at least one of said jets positioned to direct the jet into the interface between the bone and the surrounding meat and the thigh bone is advanced parallel to its own axis relative to the jet whereby the meat on the thigh is removed from the bone.

4. A process for producing fillet-size pieces of meat from fowl comprising removing the wings and legs from the fowl, directing streams of a liquid into the meat on each side of the bird to produce parallel axially extending thoracic cuts on each side of the bird and directing liquid jets in a plane intersecting the ventral process sternum on each side thereof at a relatively small angle of incidence to progressively remove the meat along the length of the sternum as the bird is moved relative to the jet along a path extending parallel to its own longitudinal axis to thereby sever the meat from the surface of the bone.

5. An automated method for removing meat from fowl comprising supporting the fowl on a fixture suitably constructed and arranged to orient the fowl in a predetermined position, advancing the fowl along an axis positioned parallel to its own longitudinal axis, directing a relatively flat sheet-like jet of liquid composed of a plurality of parallel aligned streams at a pressure of at least 1,000 p.s.i. at a relatively small angle relative to the surface of the sternum, the relative motion between the fowl and the jets causing a pair of longitudinlly extending elongated knife-like cuts between the sternum and the breast fillet to thereby separate the breast fillets from the bone, forming longitudinally extending cuts through the meat to the rib cage on each side of the thorax whereby breast fillets can be removed.

6. The process according to claim 5 wherein hydraulic jets are directed against the side of the thorax to form the longitudinally extending cuts.

7. The process defined in claim 1 wherein the relative movement step comprises effecting the relative movement in a path parallel to the plane of the thin sheet.

8. The process defined in claim 7 wherein the subjecting step comprises jetting a plurality of coplanar streams of liquid which form a relatively thin sheet of liquid.

9. The process defined in claim 1 wherein the subjecting step comprises jetting a pair of opposed, relatively thin sheets of liquid, each sheet being formed of a plurality of coplanar streams of liquid.

10. The process defined in claim 1 wherein the animal comprises a layer of outer skin and wherein the separating step comprises effecting an initial continuous knife-like cut through the skin of the animal by a knife.

11. The process defined in claim 1 wherein the animal comprises fowl and including the steps of initilly removing the wings and legs of the fowl, and wherein knife-like cuts are effected by jets of liquid axially along the thorax and between the breast meat and sternum to remove breast fillets.

12. A process for removing meat from the bone of an animal comprising:
    taking an animal having bone and meat naturally intact about the bone;
    subjecting the animal to a jet comprising a relatively thin sheet of liquid for cutting meat from the bone of the animal;
    providing relative movement between the animal and the jet of liquid; and
    successively removing meat from the bone by varying the plane of the thin sheet of liquid.

13. The process defined in claim 12 wherein the subjecting step comprises jetting a pair of opposed, relatively thin sheets of liquid, and successively subjecting the animal to diverging opposed sheets of liquid as the animal and thin sheets of liquid are moved relative to each other.

References Cited

UNITED STATES PATENTS

| 2,851,362 | 9/1958 | Goldberg | 17—1(.5)UX |
| 3,248,752 | 5/1966 | Segur et al. | 17—46 |
| 3,364,518 | 1/1968 | Brown et al. | 17—46 |

FOREIGN PATENTS

| 896,624 | 5/1944 | France. |
| 1,248,323 | 10/1960 | France. |

LUCIE H. LAUDENSLAGER, Primary Examiner

U.S. Cl. X.R.

17—1